(12) United States Patent
Rose et al.

(10) Patent No.: US 10,965,814 B2
(45) Date of Patent: Mar. 30, 2021

(54) SYSTEMS AND METHODS TO PARSE MESSAGE FOR PROVIDING ALERT AT DEVICE (71) Applicant: Lenovo (Singapore) Pte. Ltd., Singapore (SG)

(72) Inventors: Amy Leigh Rose, Chapel Hill, NC (US); Nathan J. Peterson, Oxford, NC (US); Jennifer Lee-Baron, Morrisville, NC (US); Gary David Cudak, Wake Forest, NC (US); John Scott Crowe, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/584,372

(22) Filed: Sep. 26, 2019

(65) Prior Publication Data
US 2020/0021687 A1    Jan. 16, 2020

Related U.S. Application Data (63) Continuation of application No. 15/648,627, filed on Jul. 13, 2017, now Pat. No. 10,498,900.

(51) Int. Cl.
| | |
|---|---|
| *H04W 4/90* | (2018.01) |
| *H04M 3/533* | (2006.01) |
| *H04M 3/537* | (2006.01) |
| *H04M 3/436* | (2006.01) |
| *G10L 15/18* | (2013.01) |
| *H04M 3/42* | (2006.01) |
| *G06F 40/205* | (2020.01) |
| *G10L 15/08* | (2006.01) |
| *G10L 15/26* | (2006.01) |

(52) U.S. Cl.
CPC ........ *H04M 3/5335* (2013.01); *G06F 40/205* (2020.01); *G10L 15/1822* (2013.01); *H04M 3/42187* (2013.01); *H04M 3/4365* (2013.01); *H04M 3/537* (2013.01); *G10L 15/26* (2013.01); *G10L 2015/088* (2013.01)

(58) Field of Classification Search
CPC combination set(s) only.
See application file for complete search history.

(56) References Cited

U.S. PATENT DOCUMENTS

| | | | |
|---|---|---|---|
| 7,362,852 B1 * | 4/2008 | Rodkey | G06Q 10/10 379/252 |
| 9,071,948 B2 * | 6/2015 | Sennett | H04W 4/14 |
| 2005/0159132 A1 | 7/2005 | Wright et al. | |
| 2006/0184392 A1 | 8/2006 | DelMonego et al. | |
| 2012/0276932 A1 | 11/2012 | Ferren et al. | |
| 2013/0244633 A1 | 9/2013 | Jacobs et al. | |

(Continued)

*Primary Examiner* — Quan M Hua
(74) *Attorney, Agent, or Firm* — John M. Rogitz; John L. Rogitz (57) ABSTRACT

In one aspect, a device includes a processor and storage accessible to the processor. The storage bears instructions executable by the processor to parse content of a message and determine, based on the parsing of content of the message, whether to provide a notification using the device. The instructions are also executable by the processor to provide the notification responsive to a determination, based on the parsing of content of the message, to provide the notification using the device.

20 Claims, 6 Drawing Sheets

(56) References Cited

U.S. PATENT DOCUMENTS

| | | | |
|---|---|---|---|
| 2015/0054910 A1* | 2/2015 | Offen | H04M 3/20 348/14.02 |
| 2015/0102924 A1* | 4/2015 | Soloway | G08B 25/14 340/539.11 |
| 2015/0110255 A1* | 4/2015 | Williams | H04W 4/90 379/45 |
| 2015/0229756 A1 | 8/2015 | Raniere | |
| 2016/0142894 A1 | 5/2016 | Papakonstantinou et al. | |

* cited by examiner

```
┌─────────────────────────────────────────────────────┐
│                      SETTINGS                        │
│                                                      │
│  ❑ ENABLE URGENT ALERTS ~902                         │
│                                                      │
│     PRESENT ALERTS  ☐~906  TIMES ~904                │
│                                                      │
│     PROVIDE ALERTS FOR: ~908                         │
│                                                      │
│         ❑ MEDICAL EMERGENCIES ~910                   │
│                                                      │
│         ❑ SCHOOL COMMUNICATIONS ~912                 │
│                                                      │
│     PROVIDE ALERTS : ~914                            │
│                                                      │
│         ❑ AUDIBLY ~916                               │
│                                                      │
│         ❑ VISUALLY ~918                              │
│                                                      │
│                                                      │
│  ❑ PROVIDE ALERTS TO CONNECTED DEVICES WHEN          │
│    THOSE DEVICES ARE IN USE ~920                     │
│                                                      │
│  ❑ EVEN IF ON SILENT, PRESENT INCOMING COMMUNICATIONS FROM │
│    SAME NUMBERS WHEN URGENT SITUATION IDENTIFIED ~922 │
└─────────────────────────────────────────────────────┘
```

FIG. 9

SYSTEMS AND METHODS TO PARSE MESSAGE FOR PROVIDING ALERT AT DEVICE

BACKGROUND

Often times, users will silence their smart phones during an event or meeting. However, as recognized herein, sometimes those users will not remember to turn the smart phone's ringer and notifications back on afterwards. As also recognized herein, this can have undesired consequences in that a user may not being notified of a situation requiring their immediate attention, such as a medical emergency or an important telephone call from the school of the user's child. There are currently no adequate solutions to the foregoing computer-related, technological problem.

SUMMARY

Accordingly, in one aspect a device includes at least one processor and storage accessible to the at least one processor. The storage bears instructions executable by the at least one processor to parse content of a message and determine, based on the parsing of content of the message, whether to provide a notification using the device. The instructions are also executable by the at least one processor to provide the notification responsive to a determination, based on the parsing of content of the message, to provide the notification using the device.

In another aspect, a method includes receiving a message at a first device and parsing contents of the message to determine whether to issue an alert using the first device. The method also includes determining, based on the parsing, whether to issue the alert using the first device. The method then includes issuing, based on determining to issue the alert using the first device, the alert using the first device.

In still another aspect, a computer readable storage medium that is not a transitory signal includes instructions executable by at least one processor to parse contents of a message and identify, based on the parsing, an urgent situation indicated in the message. The instructions are also executable by the at least one processor to provide, based on the identification, a notification at a first device.

The details of present principles, both as to their structure and operation, can best be understood in reference to the accompanying drawings, in which like reference numerals refer to like parts, and in which:

DETAILED DESCRIPTION

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

Figure 1:
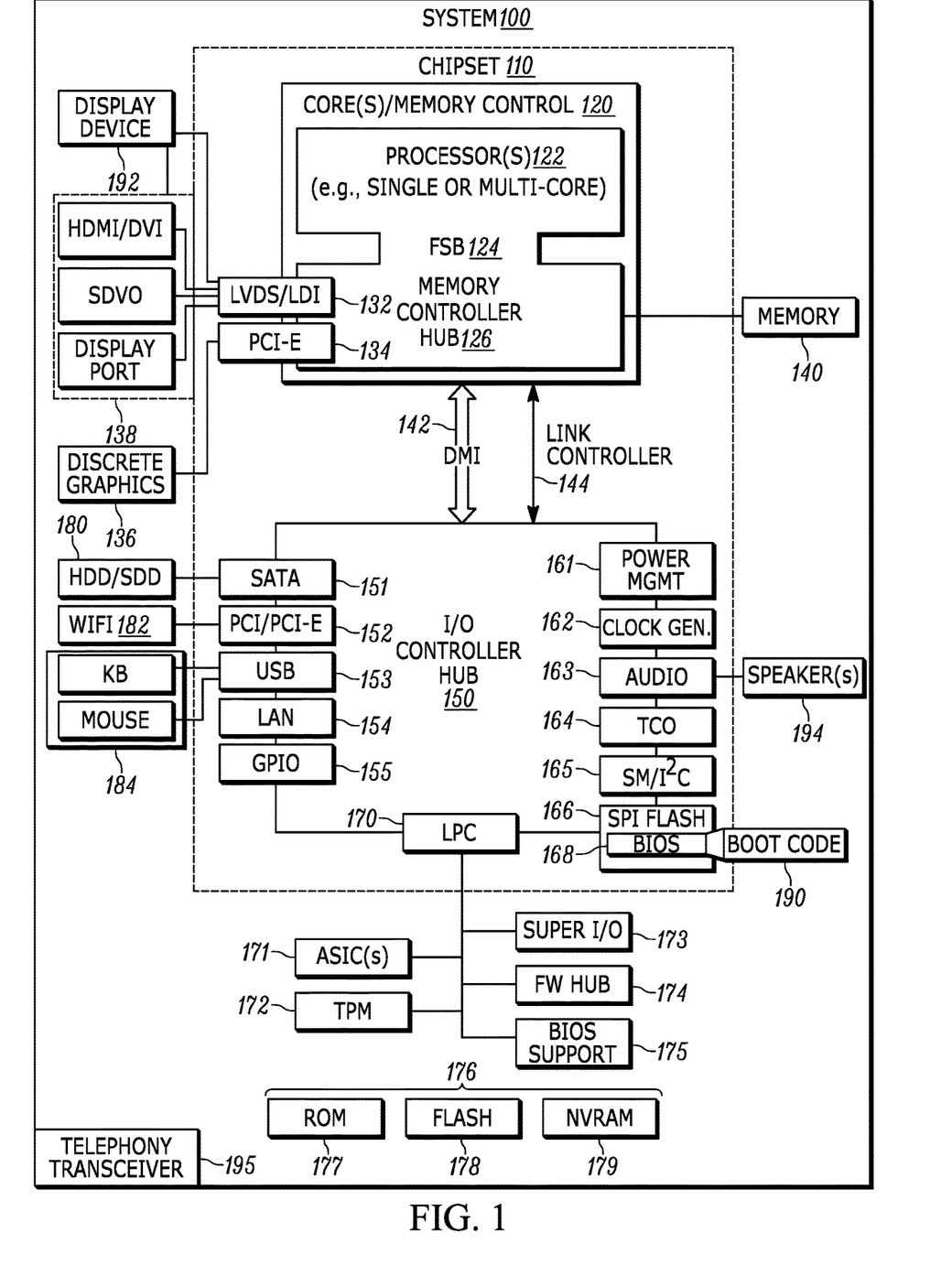
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include a telephony transceiver 195 accessible to the processor 122, such as a wireless cellular telephony transceiver, for telephone communication over one or more telephone networks in accordance with present principles. The telephone networks may include, for example, wireless cellular networks operated by respective telephone services providers.

Additionally, though not shown for clarity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video.

Further, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
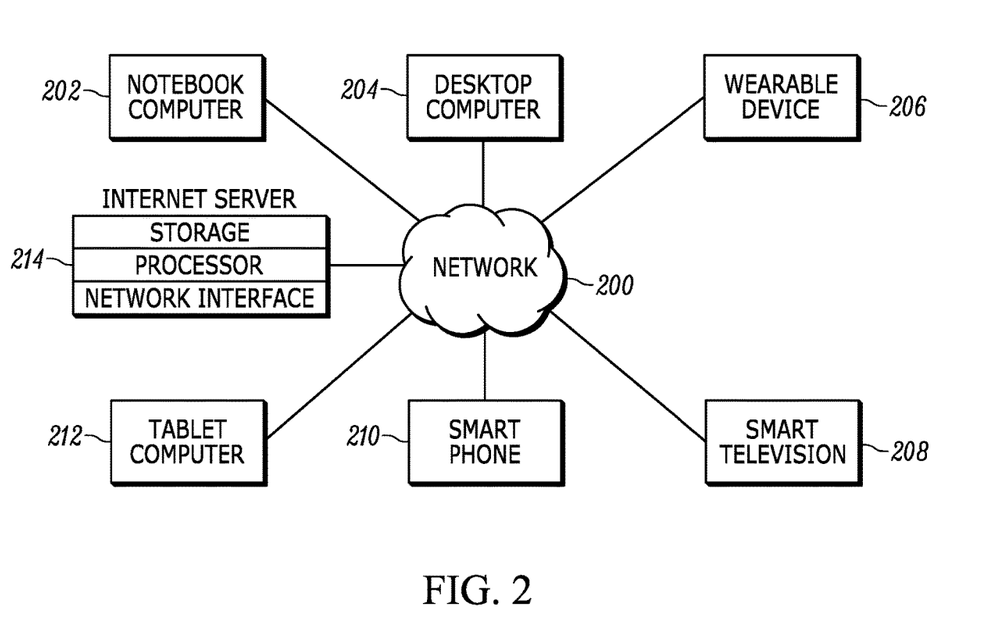
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
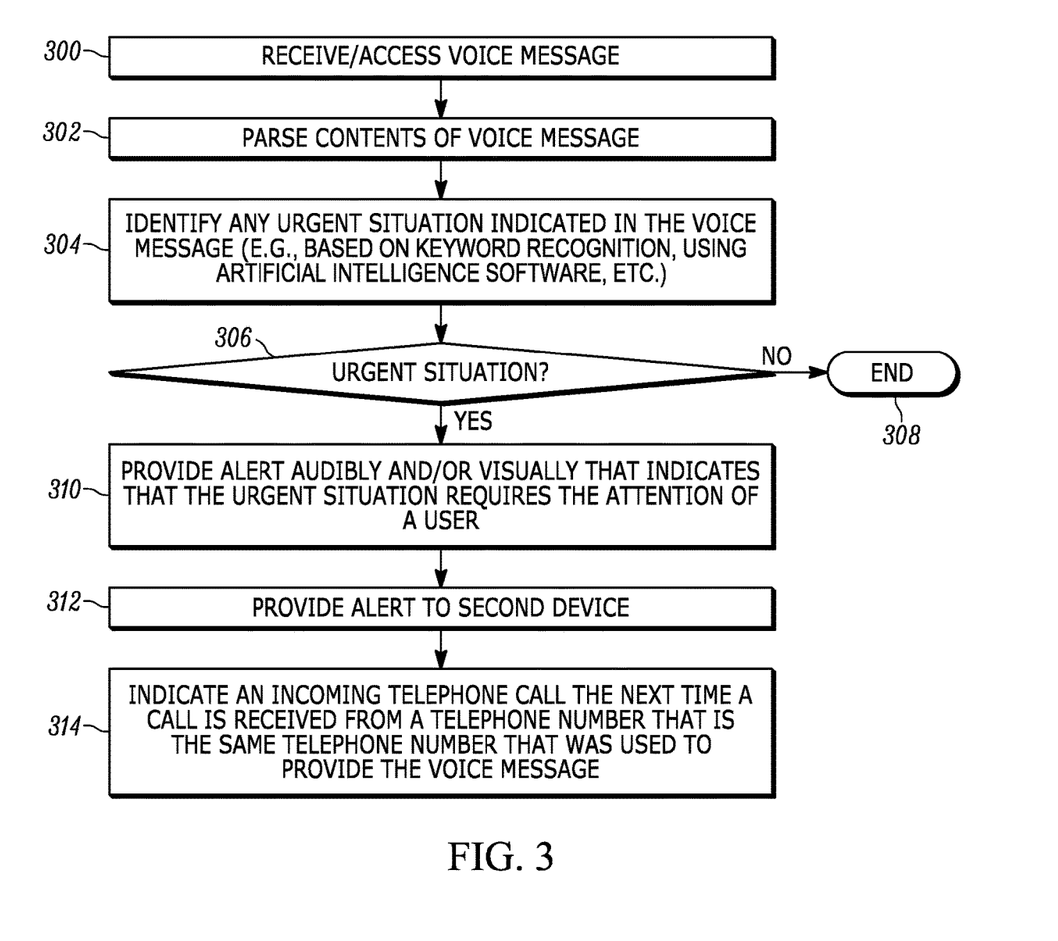
FIG. 3 is a flow chart of an example algorithm in accordance with present principles.

Referring to FIG. 3, it shows example logic that may be executed by a device such as the system 100 and/or a user's smart phone in accordance with present principles. Beginning at block 300, the smart phone may receive a voice message or access a stored voice message. The voice message may be from a caller that called about an urgent situation to which the user of the smart phone should be made aware, where the user did not answer the call itself. The voice message may be stored at the smart phone or at a server operated by an entity that provides telephone services to the smart phone, such as a wireless cellular carrier. From block 300 the logic may then proceed to block 302.

At block 302 the smart phone may parse and/or scan contents of the voice message and then at block 304 identify any urgent or emergency situation that might be indicated in the voice message. In one example, the parsing and identification may be performed using speech recognition/audio analysis software, or using speech-to-text software to convert audio of the voice message to text. Keyword recognition may then be used to identify words or phrases from the recognized speech or converted text that might indicate an emergency or urgent situation. The keywords may be stored in a database accessible to the smart phone and may include words and phrases such as "emergency", "principal", "I'm sick", and "This is doctor . . . ". Additionally or alternatively, the parsing/scanning and identification may be performed using artificial intelligence software to determine whether the voice message indicates something requiring urgent action or an emergency situation.

Metadata regarding the call may also be parsed/analyzed to determine whether the metadata indicates an urgent or emergency situation. For instance, the identity of the caller may be used to determine if an urgent or emergency situation exists, where certain callers or types of callers may be associated with urgent or emergency situations. For instance, callers from schools and callers from hospitals may always be deemed as indicative of an urgent or emergency situation existing. The identity of the caller itself may be determined by using a caller identification (ID) feature on the smart phone or provided by the telephone services provider, and/or by identifying the number itself and then executing an Internet search to determine the identity of the caller.

Then, responsive to the operation performed at block 304, the logic may proceed to block 306 where the smart phone may determine whether an urgent or emergency situation exists. The determination may be based on, for example, whether the artificial intelligence software returned an indication at block 304 that an urgent or emergency situation exists, or whether a keyword or phrase from the database described above was matched at block 304 to a word or phrase in the voice message. A negative determination at diamond 306 may cause the logic to proceed to block 308 where the logic may end. However, responsive to an affirmative determination at diamond 306, the logic may proceed to block 310.

At block 310 the smart phone may provide either or both of an audible alert/notification and a visual alert/notification at the smart phone itself. In either case, the alert may indicate that the urgent or emergency situation requires the attention of the user. Examples of these alerts will be discussed below in reference to other figures. From block 310 the logic may continue to block 312.

At block 312 the smart phone may provide an alert or notification to another device being used by the user and/or to a contact of the user such as a designated emergency contact. For example, if network activity from the user's laptop computer is detected, the smart phone may transmit an alert over the network to the laptop so that information can be presented audibly or visually at the laptop that indicates that the urgent or emergency situation requires the attention of the user. The voice message itself may even be forwarded to the laptop. As another example, the smart phone may transmit an alert to the user's spouse's device, as might have been previously designated by the user using a UI such as the settings UI 900 shown in FIG. 9 (though this particular feature is not shown in FIG. 9 for simplicity). From block 312 the logic may then proceed to block 314.

Then, at block 314, the next time a telephone call or text message is received at the smart phone from the same telephone number that was used to provide the voice message, the smart phone may present an indication of the subsequent incoming telephone call or text message. For instance, even if the smart phone's ringer has been placed on silent, the smart phone may override the silent setting and activate the smart phone's ringer to indicate a telephone call or text message from the same number that is currently incoming. As another example, even if the smart phone is in a "do not disturb" mode, the smart phone may override the mode to provide a visual alert such as illuminating a light-emitting diode (LED) on the smart phone or illuminating the smart phone's display to visually present a text message that is received from the same number that previously provided an urgent voice message.

Before moving on to the description of other figures, it is to be understood in reference to FIG. 3 that the example logic discussed above may also be executed by a server of the smart phone's telephone services provider. For example, the server may parse/scan a voicemail that it stores so that the user of the smart phone may access it when the user wishes. The server may then identify an urgent or emergency situation and issue alerts to one or more of the end-user's connected devices and even issue commands to change settings of the end-user's smart phone so that a subsequent incoming communication may be indicated at the smart phone as discussed above in reference to block 314.

Figure 4:
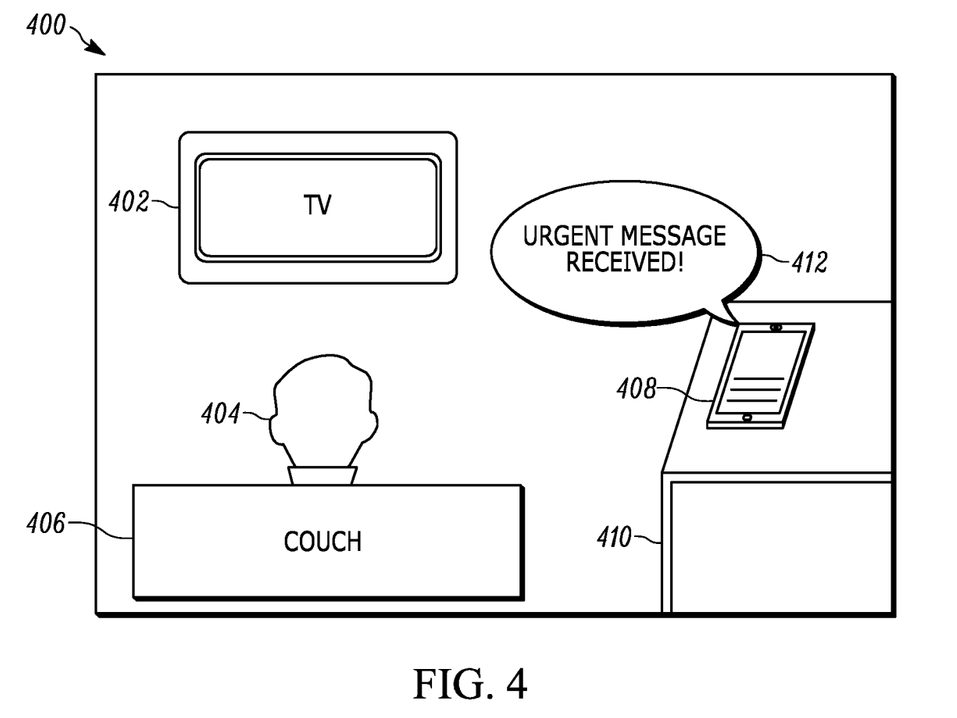
FIG. 4 is an example illustration in accordance with present principles.

Now describing FIG. 4, it shows an example illustration 400 of an audible alert or notification being provided in accordance with present principles. A user 404 is shown watching audio video content presented on a television 402 while the user 404 sits on a couch 406 in the living room of a personal residence. The user's smart phone 408 is shown sitting on a table 410 adjacent to the couch 406. The smart phone 408 is shown as providing an audible alert 412 via a speaker on the smart phone 408 based on the smart phone 408 determining that an urgent/emergency situation exists and/or based on receiving such information from another device such as a server as discussed herein. In this example, the audible alert 412 is "urgent message received".

Figure 5:
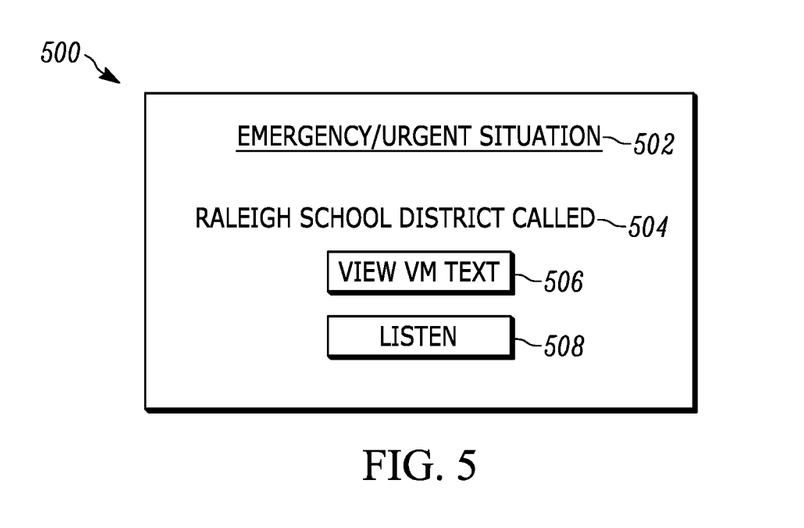
FIGS. 5-9 are example user interfaces (UIs) in accordance with present principles.

FIG. 5 shows an example of a user interface (UI) 500 that may be presented on the display of a user's smart phone to provide a visual alert to the user in accordance with present principles. The UI 500 may include an indication 502 that an urgent/emergency situation exists. The UI 500 may also include an indication 504 of a source or caller that left a voice message for the user from which the urgent/emergency situation was identified.

Additionally, a selector 506 may be presented on the UI 500. The selector 506 may be selected (e.g., using touch input or input using a cursor) to command the smart phone to automatically present text of the voice message as may have been converted from the audio of the voice message using speech-to-text software. A selector 508 may also be presented, with the selector 508 being selectable to command the smart phone to automatically present the audio of the voice message itself using speakers on the smart phone.

Figure 6:
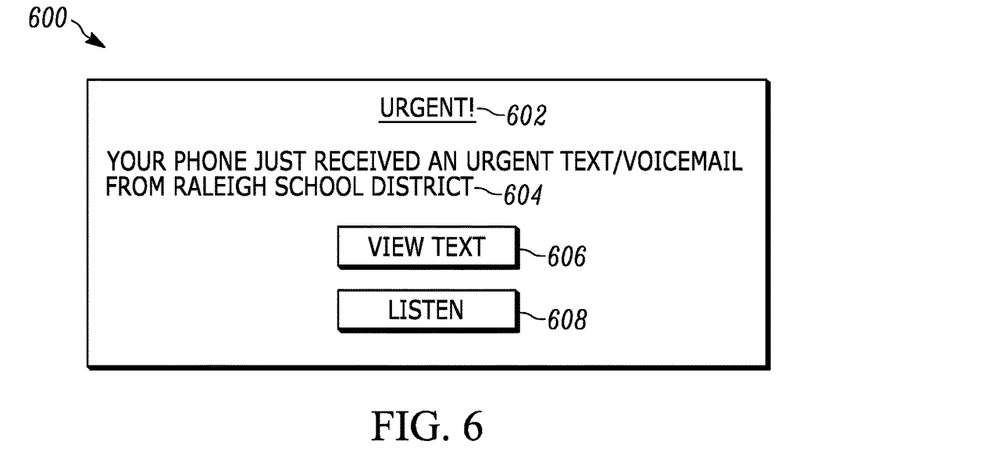

Now in reference to FIG. 6, it shows another example UI 600. However, in contrast to FIG. 5, the UI 600 of FIG. 6 may be presented on a device other than a smart phone at which an urgent/emergency voice message was received and/or other than the smart phone at which the corresponding call itself was received. For example, the UI 600 may be presented on the display of a user's laptop or tablet computer while being used by the user for another purpose such as browsing the Internet or creating a word processing document. As shown, the UI 600 may include an indication 602 that an urgent/emergency situation exists. The UI 600 may also include an indication 604 identifying the device to which the corresponding voice message or text message was directed and identifying a source or caller whom left the voice message/text message.

The UI 600 may also include a selector 606. The selector 606 may be selected to provide a command to automatically present text of the voice/text message at the other device (e.g. laptop or tablet). A selector 608 may also be presented, with the selector 608 being selected to provide a command to automatically present audio of the voice/text message at the other device. For example, either of these commands may cause the smart phone to forward the text or audio of the message itself to the other device for presentation at the other device.

Figure 7:
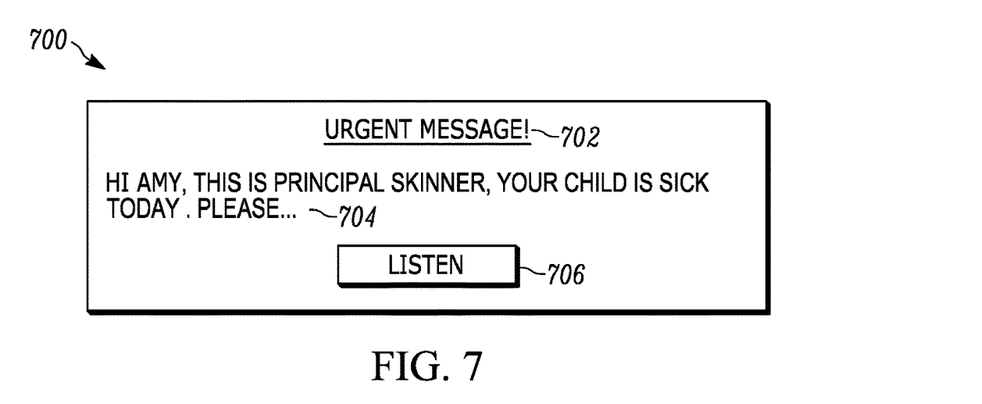

Continuing the detailed description in reference to FIG. 7, it shows yet another example UI 700. The UI 700 may present text of a voice message or text message that has been received and that indicates an urgent/emergency situation. For example, the UI 700 may be presented at the appropriate device responsive to selection of either of the selector 506 or selector 606.

The UI 700 may indicate that something urgent requires the attention of the user via an indication 702. Text 704 of the voice message or text message may also be presented so that a user may read the text 704. If a voice message, a selector 706 may also be presented on the UI 700. The selector 706 may be selected to command the device to automatically present the audio of the voice message.

Figure 8:
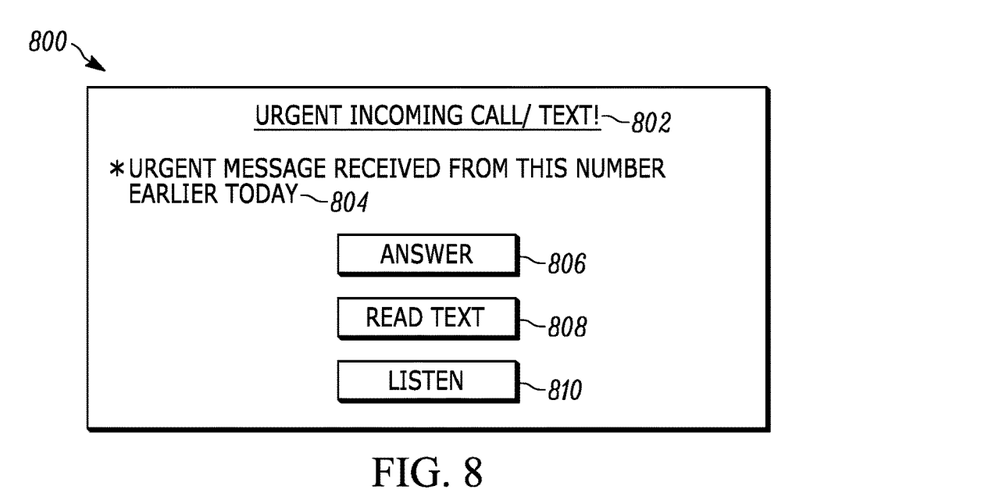

FIG. 8 shows yet another example UI 800 that may be presented on the display of a smart phone in accordance with present principles. The UI 800 may include an indication 802 that a telephone call or text message is currently incoming to the smart phone. The UI 800 may also include an indication 804 that an urgent message was received earlier in the same day from the same number associated with the incoming telephone call or text message. Thus, it is to be understood that in some examples the UI 800 may be presented if an urgent message was previously received no more than a threshold time before the time of the incoming telephone call or text message. The threshold may be, e.g., twelve hours before or one day before.

If an incoming telephone call, the UI 800 may include a selector 806 that is selected to answer the incoming telephone call. If an incoming text message, the selector 806 may be selected to view the incoming text message using the smart phone's display.

Additionally, a selector 808 and a selector 810 may be presented as part of the UI 800. The selector 808 may be selected to command the smart phone to automatically present text of the previously received voice message or text message. Selector 810 may be selected to command the smart phone to automatically present audio of the previously received voice message or text message. If the selector 810 were selected and the message were a text message, text-to-speech software may be used to convert the text message to audio for presentation.

Figure 9:
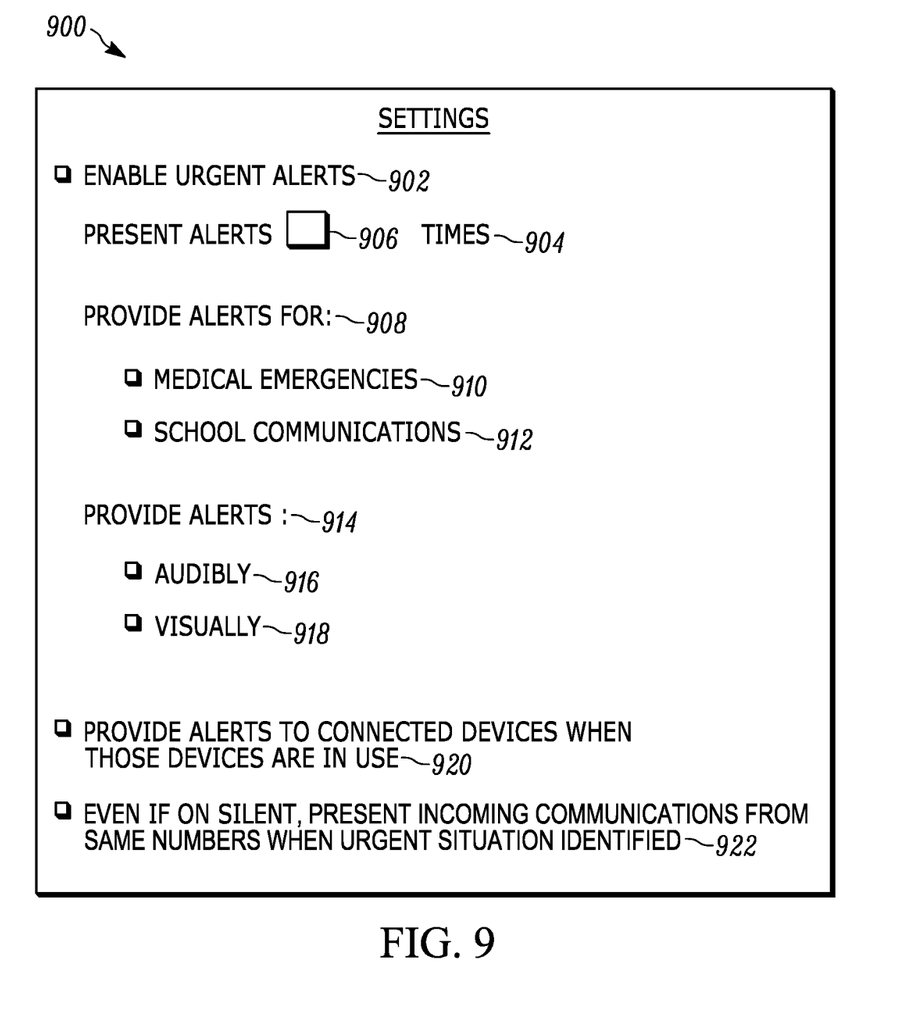

Now in reference to FIG. 9, an example UI 900 is shown that may be presented on the display of a device undertaking present principles, such as the display of a smart phone. The UI 900 may be for configuring settings of the device. Each of the options to be discussed below may be respectively selected by directing touch or cursor input to the corresponding check box shown adjacent to each option.

As shown, a first option 902 may be presented as part of the UI 900. The first option 902 may be selected to enable/ configure the device to provide urgent notifications in accordance with present principles. For example, the option 902 may be selected to enable the device to undertake the logic of FIG. 3 and/or present any of the UIs shown in FIGS. 5-8. The option 902 may be accompanied by a setting 904 at which a user may enter, to input box 906, a number of times that such notifications should be provided for a given urgent message. For instance, should a user input the number four into box 906, the device may be configured to present a notification of an urgent text message four times subsequent to the initial notification of the incoming text message, with each subsequent time separated by an equal length of predetermined time (such as half an hour).

The UI 900 may also include a setting 908 for selecting various types of situations for which to provide notifications/alerts in accordance with present principles, as might be identified using artificial intelligence or keyword recognition. As examples, option 910 may be selected to configure the device to provide notifications/alerts for medical emergencies, and option 912 may be selected to configure the device to provide notifications/alerts for communications from schools.

Still in reference to FIG. 9, the UI 900 may also include a setting 914 for selecting types of notifications/alerts to be provided by the device. As examples, option 916 may be selected to configure the device to provide audible notifications/alerts as disclosed herein, and option 918 may be selected to configure the device to provide visual notifications/alerts as disclosed herein.

Additionally, the UI 900 may include an option 920 that is selectable to command the device to provide notifications/alerts to other devices when those other devices are determined to be in use by a user as disclosed herein. For instance, selection of option 920 may enable/configure the device to execute the step described above in reference to block 312. Still further, the UI 900 may include an option 922 that is selectable to present incoming communications from a same number from which an urgent message was previously received, even if the device may have been placed in a silent or "do not disturb" mode as disclosed herein. For instance, selection of option 922 may enable/configure the device to execute the step described above in reference to block 314.

Before concluding, it is to be understood that present principles apply for identifying an urgent or emergency situation not just from voice messages and text messages but also for identifying an urgent or emergency situation from an email message or a message using a particular messaging application or service such as Skype, Lync, WeChat, Facebook, Twitter, etc.).

Also before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory, propagating signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A server, comprising:
   at least one processor; and
   storage accessible to the at least one processor and bearing instructions executable by the at least one processor to:
   parse content of a message;
   determine, based on the parsing of content of the message and based on identifying a second device as currently in use, to issue a command to the second device to change at least one setting of the second device, the second device being different from the server; and
   issue, based on the determination, the command to the second device to change at least one setting of the second device.

2. The server of claim 1, wherein the command is issued to the second device so that an indication of a subsequent incoming communication is provided at the second device.

3. The server of claim 1, wherein the command is issued to change the at least one setting so that a ringer of the second device is no longer set to silent.

4. The server of claim 1, wherein the command is issued to override a setting for not providing text message and/or telephone call notifications.

5. The server of claim 1, wherein the command is issued to change the at least one setting so that an audible notification regarding a text message or telephone call is provided at the second device.

6. The server of claim 1, wherein the command is issued to configure the second device to illuminate an electronic display as part of a visual notification regarding a text message.

7. The server of claim 1, wherein the instructions are executable to:
   determine, based on the parsing of content of the message, that an urgent or emergency situation exists; and
   issue, responsive to determining that an urgent or emergency situation exists, the command to the second device.

8. A method, comprising:
   parsing, at a server, content of a message;
   determining at the server, based on the parsing of content of the message and based on identifying a second device as currently in use, to issue a command to the second device to change at least one setting of the second device, the second device being different from the server; and
   issuing, using the server and based on the determining, the command to the second device to change at least one setting of the second device.

9. The method of claim 8, wherein the command is issued to the second device so that an indication of a subsequent incoming communication is provided at the second device.

10. The method of claim 8, wherein the command is issued to change the at least one setting so that a ringer of the second device is no longer set to silent.

11. The method of claim 8, wherein the command is issued to override a setting of the second device to not provide audible text message notifications and/or audible telephone call notifications.

12. A computer readable storage medium (CRSM) that is not a transitory signal, the computer readable storage medium comprising instructions executable by at least one processor of a first device to:
  parse content of a message;
  determine, based on the parsing of content of the message, that an urgent or emergency situation exists;
  identify a second device as being currently in use; and
  issue, based on the determination and the identification, a command to the second device to change at least one setting of the second device.

13. The CRSM of claim 12, wherein the command is issued to override a setting for not providing, at the second device, audible text message notifications and/or audible telephone call notifications.

14. The server of claim 1, wherein the message is a social media message and/or an email message.

15. The CRSM of claim 12, wherein the instructions are executable to:
  determine, based on the parsing of content of the message and based on an identity of an entity that sent the message, that the urgent or emergency situation exists, the identity of the entity being determined based on an Internet search by the first device.

16. The server of claim 1, wherein the identification of the second device as currently in use is based at least in part on detection of network activity by the second device.

17. The method of claim 8, wherein the identifying of the second device as currently in use is based at least in part on detection of network activity by the second device.

18. The method of claim 8, comprising:
  presenting a graphical user interface (GUI) on a display, the GUI comprising an option that is selectable to enable a server to, in the future, issue respective commands to respective devices to change respective settings of the respective devices responsive to respective determinations at the server that respective messages sent to the respective devices indicate an urgent or emergency situation exists.

19. The CRSM of claim 12, wherein the identification of the second device as being currently in use is based at least in part on detection of network activity by the second device.

20. The CRSM of claim 12, wherein the instructions are executable to:
  present a graphical user interface (GUI) on a display, the GUI comprising an option that is selectable to enable the first device to issue respective commands to respective other devices to change respective settings of the respective other devices responsive to respective determinations that respective communications sent to the respective other devices indicate an urgent or emergency situation exists.

* * * * *